Dec. 17, 1968 H. J. SCHLADITZ 3,416,946

METHOD AND APPARATUS FOR COATING THE INNER SURFACE OF A CAPILLARY SYSTEM

Filed Dec. 1, 1965

INVENTOR:

HERMANN J. SCHLADITZ

BY

Kane, Dalsimer, Kane & Smith

ATTORNEYS

United States Patent Office 3,416,946
Patented Dec. 17, 1968

3,416,946
METHOD AND APPARATUS FOR COATING THE INNER SURFACE OF A CAPILLARY SYSTEM

Hermann J. Schladitz, Munich, Germany, assignor to Schladitz-Whiskers A.G., Zug, Switzerland, a company of Switzerland Filed Dec. 1, 1965, Ser. No. 510,874
11 Claims. (Cl. 117—61)

Figure 1:
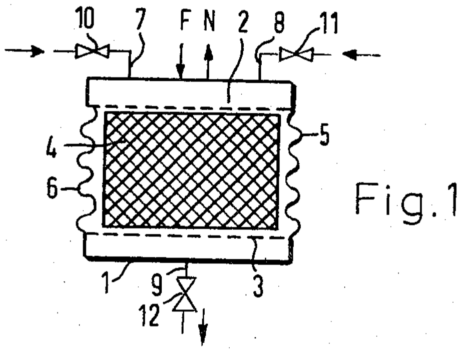

Processes for the metallization of capillary systems by disintegrating thermally decomposable metal compounds are known, in which the capillary system is heated to the decomposition point of the metal compound by passing hot gases therethrough, whereupon the metal compound is itself passed, in the gaseous state, through the capillary system under pressure. Such methods are not very suitable for achieving complete metallization of voluminous capillary systems such as blocks of foamed plastics material, since the hot gases and subsequently the gaseous metal compound passing through the capillary system tend to take the route of least flow resistance so that the inner surface of the capillary systems is neither uniformly heated nor, as a result, completely metallized. Furthermore, the previous methods are not successful in treating capillary systems having very fine capillaries, since the flow resistance associated with such capillaries is considerable and calls for the use of high pressures, which, however, tend to deform the capillary system, particularly when it is non-rigid in nature, as in foamed plastics materials, which deformation makes the capillary system at least partly impermeable to gas and therefore incapable of being uniformly heated and metallized.

It is an object of the invention to provide a way of coating the inner surface of a capillary system by depositing thereon metals from thermally decomposable metal compounds or by depositing thereon the decomposition products from other thermally decomposable compounds such as ethylene silicide or hydrocarbons, in which the capillary system can be of considerable thickness. According to the invention this object is achieved by passing a liquid or gaseous heating medium into the capillary system and pumping it out again until all points of the capillary system have reached the temperature corresponding to the decomposition point of the thermally decomposable compound, and then passing said compound into the capillary system and pumping it out again once or repeatedly. The entire process can be repeated several times until the walls of the capillary system have become coated to the desired thickness.

By using the process of the invention it is possible to heat the capillary system uniformly and very rapidly, with the result that temperatures can be used which are higher than the maximum temperatures at which the material of the capillary system is stable. Since the subsequent coating of the walls of the capillary system can also be effected very quickly, it is possible to apply the present method to capillary systems of material of low thermal stability, such as foamed plastics materal or rubber foam. It is further possible to add to the thermally decomposable compound passed as a gas through the capillary system particles of material which become suspended therein and which are deposited on the walls of the capillary system with the decomposition products of the said compound.

By pumping out the heating medium and then the unconverted portion of the gaseous thermally decomposable compound together with the gaseous decomposition products thereof, the process ensures that every capillary is substantially filled with the heating medium and subsequently with the compound so that the walls of all the capillaries are heated to the decomposition point of the compound and are contacted by the compound with the result that substantially the entire capillary system is coated in the desired manner.

When it is desired to coat the walls of a capillary system in a non-rigid material, such as a soft plastics foam or the like, the heating medium and the compound to be decomposed can be pumped through the capillary system simply by alternately compressing and releasing the material in which the capillary system is formed so as to evacuate the capillaries on compression and cause heating medium to be sucked into the capillaries on release, due to the vacuum created in the capillaries. The material containing the capillary system is then again compressed and subsequently released so as to suck in further quantities of heating medium, and this process is repeated a sufficient number of times to ensure that all points of the capillary system have reached the decomposition temperature of the compound. At the end of this heating process the heating medium is evacuated from the capillaries by compressing the capillary system, whereupon on subsequent release the gaseous thermally decomposable compound is admitted and thus sucked into all of the capillaries, where it decomposes, the decomposition products being deposited onto the walls of the capillaries. This process can be repeated as often as is necessary to achieve the desired thickness of coating.

In the case of rigid capillary systems, as also of non-rigid ones, the process of the invention can be carried out by placing the capillary system in a chamber which is subjected to a partial vacuum before the heating medium or thermally decomposable compound is admitted, so that the gas present in the capillaries is removed each time before the heating medium or the compound is admitted. The partial vacuum merely serves to withdraw the gas out of the capillaries and can therefore be very slight.

The process of the invention and apparatus for carrying it into effect are described below with reference to the drawings.

Figure 2:
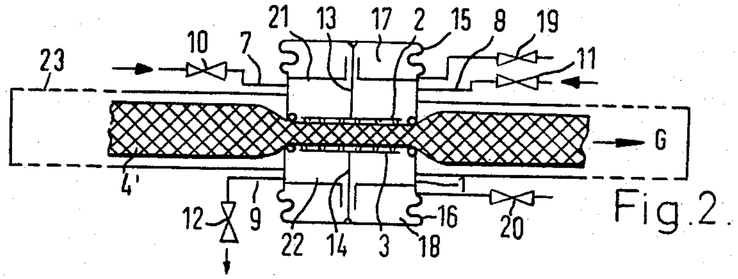
Figure 3:
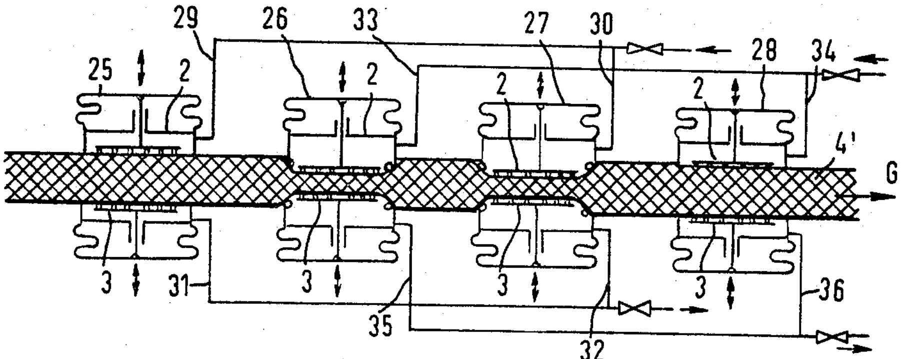
Figure 4:
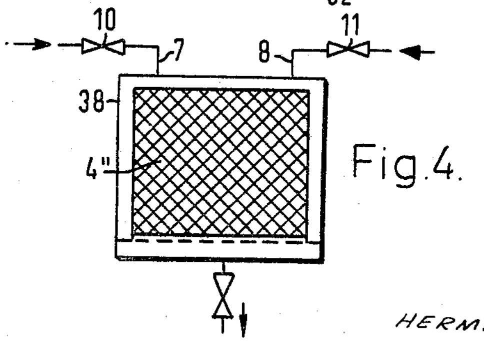

FIG. 1 is a diagrammatical representation of a device for compressing and releasing a non-rigid capillary system to induce the passage of heating medium and thermally decomposable compound therethrough; FIGS. 2 and 3 show devices similar to that shown in FIG. 1, for treating a continuous length of a non-rigid capillary system in stages; and FIG. 4 shows a device in which the heating medium and the compound to be decomposed are induced to flow through a rigid or non-rigid capillary system under partial vacuum.

Referring to FIG. 1 there is shown a sealed vessel 1, inside which are are provided perforated plates 2 and 3 which are substantially parallel to each other and between which there is disposed a flexible capillary system 4, for example, a block of foamed plastics material. The plates 2 and 3 are attached to the side walls 5 and 6 of the vessel 1. In the present embodiment, the side walls are in the form of bellows to allow for movement of the plates 2 and 3 towards and away from each other. Instead of the bellows arrangement the side walls could be arranged to telescope into a form of smaller height dimensions. The vessel 1 has an inlet 7 for a liquid or gaseous heating medium, an inlet 8 for the thermally decomposable compound to be disintegrated, for example, iron carbonyl or nickel carbonyl, and an outlet 9 for the used heating medium and the gaseous decomposition products of the compound to be decomposed. The inlets 7 and 8 and the outlet 9 can be closed by means of valves 10, 11 and 12, respectively. The capillary system 4 between the plates 2 and 3 is compressed either by means of a force applied in the direction of the arrow F or by evacuating the vessel 1 by applying a suction force at the outlet 9. This process is carried out with the valve 12 open and the valves 10 and 11 shut. After the valve 12 has been closed, the valve 10 is opened to admit into the vessel 1 an inert gas at a temperature of 120° C. to 200° C., which is sucked into the capillaries of the expanding capillary system 4 due to the vacuum in the vessel 1. The heating gas may be fed into the vessel 1 under slight pressure if desired. The valve 10 is then closed and the valve 12 opened whilst the capillary system 4 is compressed in the manner described above so as to force the heating medium out of the capillaries of the capillary system 4 and out of the vessel 1 through the outlet 9.

This process of filling and emptying the capillary system 4 with heating medium is continued until all points of the capillary system have reached a temperature sufficiently high to effect decomposition of the particular thermally decomposable compound to be used. After the final evacuation of the heating medium out of the capillary system 4 by pressing the plates 2 and 3 together, the valves 10 and 12 are maintained closed whilst the valve 11 is opened to admit into the expanding capillary system 4 the thermally decomposable compound in vapor form. The compound decomposes in the capillaries and the walls of the capillaries are coated with the desired deposit, for example of iron or nickel. The valve 11 is then closed and the valve 12 opened, whereupon the unconverted compound and its gaseous reaction products are expelled by depressing the plate 2. Then, either the valve 12 is closed and the valve 11 opened to admit fresh compound, which is sucked into the capillary system 4 as before, or the valve 12 is closed and the valve 10 opened to admit heating medium to raise the temperature of the capillary system to the required level if necessary. It is convenient for the walls of the vessel 1 to be of a deposit-repellent material such as polytetrafluoroethylene to avoid the build-up thereon of thick or very thick layers of the decomposition product. The capillary system 4 can be compressed, as mentioned above, either by the application of a force in the direction of the arrow F or by the pressure of the ambient air if the interior of the vessel 1 is subjected to periodic suction by means of a suction pump connected to the outlet 9. This last-named method has the advantage that the used heating medium and the gaseous decomposition products of the thermally decomposable compound can be removed from the capillaries of the capillary system 4 much more rapidly and more thoroughly, whilst the return movement of the plate 2 and thus the speed of expansion of the capillary system 4 can be accelerated by a mechanical force such as that of a tension spring acting in the direction of the arrow N.

The apparatus shown in FIG. 2 operates on the same principle as that shown in FIG. 1 but is adapted for coating the walls of a continuous length of a non-rigid capillary system 4' portion by portion, the continuous length or web being advanced intermittently in the direction of the arrow G in a tube 23 filled with an inert gas, by means of driving equipment (not shown). The perforated plates 2 and 3 are reciprocated vertically so as to move towards and away from each other in synchronism so that the portion of the capillary web 4' between the plates is alternately compressed and released. The movement of the plates 2 and 3 is effected by means of rods 13 and 14 respectively, which are in turn moved for example by bellows 15 and 16 respectively, the interior space 17 and 18 respectively of these bellows being subjected to pressure fluctuations therein caused by a gas or liquid being forced in and sucked out through valves 19 and 20. Alternating actuation of the valves 10 and 12 in synchronism with the compression and release of the web portion between the plates 2 and 3 causes heating medium to be pumped through the said portion of the capillary web, and this is continued until all points of the capillary system in said portion reach the desired decomposition temperature. The valve 10 is then closed and with the valve 12 open the valve 11 is opened, whereupon the compound to be decomposed flows through the communicating chambers 21 and 22 of the vessel 1. Continued contra-reciprocation of the plates 2 and 3 causes the compound to be sucked into the capillary system and the non-deposited decomposition products and the unconverted gases to be forced out, whereupon fresh heating medium or further quantities of the compound to be decomposed are admitted as and if required. Whilst the capillary spaces are heated and coated with the desired deposit in this manner, with uninterrupted contra-reciprocation of the plates 2 and 3, the capillary web 4' is slowly advanced intermittently in the direction of the arrow G to subject one portion of the capillary system after the other to the heating and coating processes. This makes it possible to coat, for example to metallize, capillary systems in the form of webs, for example foams, completely, portion by portion, in a continuous process.

The apparatus shown in FIG. 3 is adapted to heat and coat a web 4' of a non-rigid capillary system, portion by portion, the web being passed through a plurality of chambers 25, 26, 27 and 28. In each of these chambers there are provided two perforated plates 2 and 3 similar to those of FIG. 1, which plates can be contra-reciprocated in the manner described above, the web 4' passing between them. The capillary system is heated in the chambers 25 and 27, to which the heating medium is fed through the conduits 29 and 30 respectively, whilst the used heating medium flows out or is sucked out through the conduit 31 and 32 respectively. The capillary system is coated in the chambers 26 and 28, to which the compound to be decomposed is fed through the conduits 33 and 34 respectively, whilst the unconverted gases and the gaseous decomposition products of this compound are withdrawn through the conduits 35 and 36 respectively. When the web 4' is advanced in the direction of the arrow G, each portion thereof is first of all heated in the chamber 25 to the decomposition temperature and then passed to the chamber 26, where it is coated, for example by metallization, before passing on to the chamber 27 to be reheated. It then passes to the chamber 28 to receive a further coating before finally leaving the apparatus. It will be appreciated that more heating and coating chambers can be added, depending on the thickness of coating that is desired.

The appartus shown in FIG. 4 is adapted for heating rigid or non-rigid capillary systems. The capillary system 4'' is placed in a closed vessel 38, inside which a partial vacuum is periodically created by means of a pump connected to the conduit 39. With the valves 11 and 12 closed the heating medium is passed through the conduit 7 and rapidly sucked into the capillaries of the capillary system 4'' on account of the partial vacuum in the vessel 38. With the valves 10 and 11 closed and the valve 12 open the chamber 38 is then evacuated followed by renewed admission of heating gas through the valve 10 if necessary, this cycle being repeated the necessary number of times to achieve the requisite decomposition temperature inside the capillary system, whereupon the valves 10 and 12 are closed and the compound to be decomposed is introduced through the valve 11. This process is repeated a sufficient number of times to achieve a coating on the walls of the capillaries which has the desired thickness.

Thus, among others the aforenoted objects and advantages are most effectively attained. Although several preferred embodiments have been disclosed in detail herein, it should be understood that this invention is in no sense limited thereby and its scope is to be determined by the appended claims.

I claim:

1. A process for the coating of the inner surface of a capillary system by the decomposition products of a thermally decomposable compound, comprising admitting a heating medium into the capillary system prior to admittance of the thermally decomposable heating compound, admitting into and removing the heating medium at least one time until all points of the capillary system have reached the decomposition temperature of the thermally decomposable compound, whereupon said compound is admitted into and removed out of the capillary system at least one time.

2. The invention in accordance with claim 1 wherein the admission and withdrawal of the heating medium and that of the thermally decomposable compound are alternately repeated the necessary number of times to achieve a predetermined thickness of coating.

3. The invention in accordance with claim 1 wherein the capillary system is non-rigid and the heating medium and the thermally decomposable compound are pumped through the capillary system by means of alternate compression and release of the capillary system.

4. The invention in accordance with claim 1 wherein the capillary system is placed in a chamber in which a partial vacuum is created each time before the heating medium or the thermally decomposable compound is admitted.

5. Apparatus for coating the inner surface of a non-rigid capillary system by the decomposition products of a thermally decomposable compound comprising a sealed vessel, two substantially parallel, perforated plates in said vessel, means for rendering the plates contra-reciprocated, and means for disposing the non-rigid capillary system between the plates, and closable conduit means coupled with the vessel for withdrawing a heating medium after use from the vessel.

6. The invention in accordance with claim 5 wherein a closable conduit is coupled with the vessel for admitting the thermally decomposable compound to be decomposed into the vessel.

7. The invention in accordance with claim 5 wherein the vessel includes a bellows coupled with the plates.

8. The invention in accordance with claim 5 wherein the walls of the vessel include a deposit-repellent material.

9. The invention in accordance with claim 5 wherein a suction pump is connected to the vessel to create a partial vacuum in the vessel.

10. The invention in accordance with claim 5 wherein means are provided for intermittently advancing a web between the plates.

11. The invention in accordance with claim 10 wherein a plurality of chambers containing contra-movable plates are disposed in a series, through which the web is intermittently advanced, conduits for admitting and withdrawing the heating medium being connected to some of said chambers, conduits for admitting the thermally decomposable compound and withdrawing the unconverted gases and the gaseous decomposition products of said compound being connected to the other chambers, a chamber receiving the heating medium being followed by a chamber receiving the compound to be decomposed.

References Cited

UNITED STATES PATENTS

| | | | |
|---|---|---|---|
| 2,918,392 | 12/1959 | Beller | 117—98 |
| 3,203,086 | 8/1965 | Eyraud et al. | |

ALFRED L. LEAVITT, *Primary Examiner.*

A. G. GOLIAN, *Assistant Examiner.*

U.S. Cl. X.R.

117—47, 95, 98, 107.1, 107.2; 118—49, 50